H. H. SHORTHILL.
AUTOMOBILE HEADLIGHT.
APPLICATION FILED OCT. 12, 1916. RENEWED JAN. 24, 1918.

1,262,275.   Patented Apr. 9, 1918.

Inventor
H. H. SHORTHILL
By
H. S. Hiser Attorney

UNITED STATES PATENT OFFICE.

HARRY H. SHORTHILL, OF LAKE CITY, COLORADO.

AUTOMOBILE-HEADLIGHT.

1,262,275. Specification of Letters Patent. Patented Apr. 9, 1918.

Application filed October 12, 1916, Serial No. 125,255. Renewed January 24, 1918. Serial No. 213,613.

*To all whom it may concern:*

Be it known that I, HARRY H. SHORTHILL, a citizen of the United States, residing at Lake City, in the county of Hinsdale, State of Colorado, have invented a new and useful Automobile-Headlight; and I do hereby declare the following to be a full, clear, and exact description of the invention, such as will enable others skilled in the art to which it appertains to make and use the same.

The present invention relates to certain new and useful improvements in dirigible lamps for motor vehicles, and has for its object to provide a device of this character which embodies novel features of construction whereby it can be readily turned to either the right or left for the purpose of illuminating either side of the road.

Further objects of the invention are to provide a device of this character which is comparatively simple and inexpensive in its construction, which can be readily mounted upon a motor vehicle, which normally projects the light straight ahead, but can be swung to either side at the will of the driver, and which can be quickly adjusted to fit any lamp bracket.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
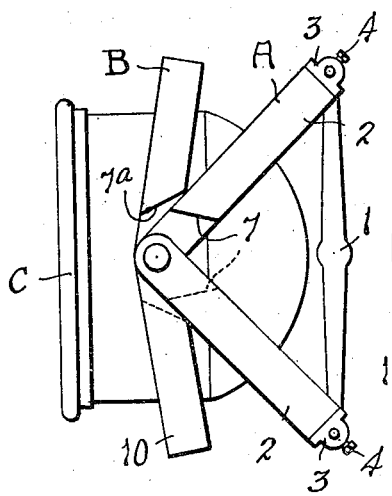
Figure 1 is a top plan view of a dirigible automobile lamp constructed in accordance with the invention.

Referring to the drawings, which illustrate one embodiment of the invention, the reference numeral 1 designates a forked lamp bracket which is of the conventional construction, and which may be rigidly mounted upon the motor vehicle in any suitable manner. An outer frame A is rigidly supported upon the arms of the bracket, and an inner frame B is arranged within the outer frame A and mounted to turn about a vertical axis, said inner frame carrying the lamp C.

Figure 2:
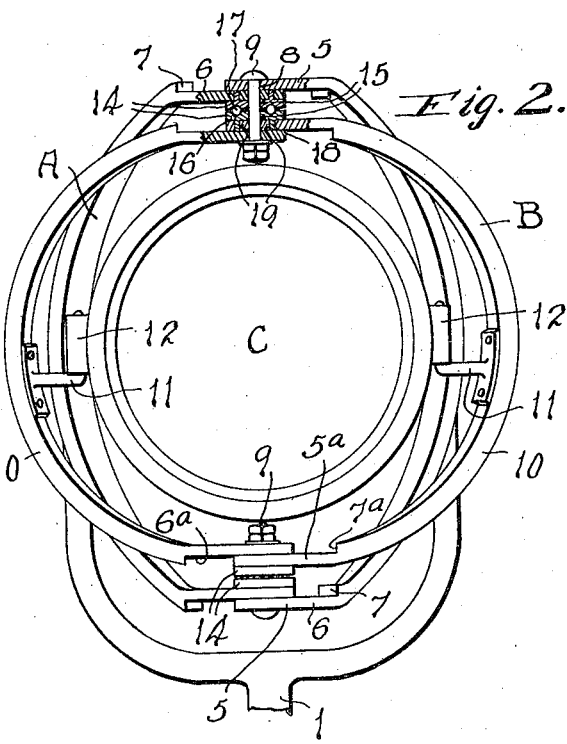
Fig. 2 is an enlarged front elevation thereof, portions being broken away and shown in section.
Figure 3:
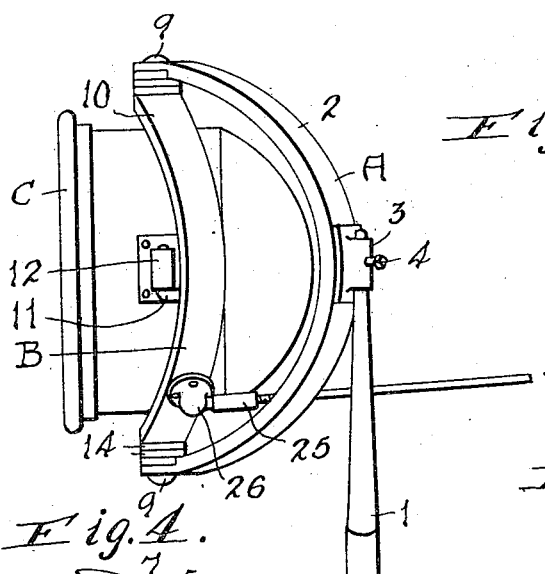
Fig. 3 is a side elevation of the lamp, showing one form of operating mechanism therefor, portions being broken away and shown in section.
Figure 5:
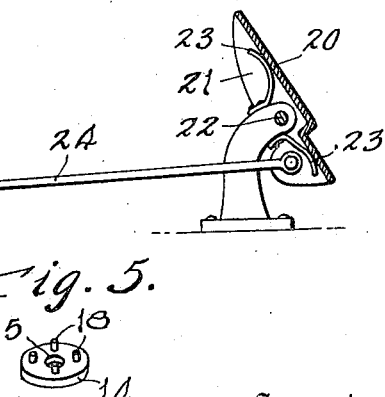
Fig. 5 is a detail view of one of the bearing plates.
Figure 4:
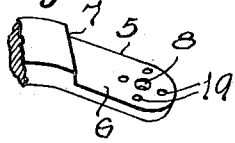
Fig. 4 is a detail view of one end of one of the side halves of the outer frame.

The outer frame A is formed in two interchangeable and complemental side sections 2, said sections being shown as substantially semicircular in shape and of substantially rectangular cross section, and being each provided with an outstanding perforate lug 3 for engagement in the usual manner with an arm of the forked lamp supporting bracket 1. The usual set screws 4 may be provided for clamping the perforated lugs 3 rigidly in position upon the bracket 1. The ends of each of the side sections 2 are straight as indicated at 5, and are cut away for substantially one half of their thickness as indicated at 6, the shoulders 7 formed by the cut away portions being formed diagonally across the side sections for a purpose to be hereinafter described. The outer faces of the ends of one of the side sections 2 are cut away while the inner faces of the ends of the other side section 2 are cut away. The corresponding ends 5 of the side sections 2 are overlapped, as clearly indicated by Fig. 2, and are provided with corresponding openings 8 adapted to receive the pivot bolts 9. The cut away portions 6 of the ends of the side sections allow the ends to be overlapped so as to form substantially the same thickness as the body of the sections, while the diagonally extending shoulders 7 allow the sections to be swung toward each other about the pivot bolts 9 to a greater extent than would be possible if the shoulders 7 extended at right angles to the sides of the sections 2. It will be obvious that the pivotal movement of the sections 2 about the pivot bolts 9 allows the perforate lugs 3 to be swung nearer together or farther apart as the case may be, and the object of this construction is to allow adjustments of the distance between the lugs 3 so that the frame A may be applied to lamp brackets of different sizes. The sections 2 may be swung relative to each other until the perforations in the lugs 3 register with the arms of the forked lamp bracket 1, and the frame A may then be secured to the bracket 1 by tightening the screws 4.

The inner swinging frame B is, in a similar manner, formed in two complemental side sections 10, each side section being provided with an inwardly projecting angular bracket 11, the two brackets 11 engaging the usual perforated lugs 12 at the sides of the lamp C. The construction of the sections 10 of the inner swinging frame B are identical with that of the outer frame A, although the sections 10 are somewhat smaller than the sections 2 of the frame A so that they will loosely swing within the frame A. The ends of the sections 10 of the frame B are straight as indicated at 5ᵇ and are cut away at 6ᵃ exactly as are the ends 5 of the sections 2 of the frame A, the shoulders 7ᵃ formed by the cut away portions extending diagonally across the sections 10 for the same purpose as the shoulder 7 of the sections 2. The ends 5ᵃ of the sections 10 are overlapped and are provided with corresponding openings 13 also adapted to receive the pivot bolts 9 above referred to. It will thus be seen that both of the frames A and B are pivotally mounted upon the same pivot bolts 9 and the inner frame B is mounted to swing within the outer frame A. The sections 10 of the frame B may be swung relatively toward or away from each other to bring the brackets 11 into proper engagement with the perforate lugs 12 upon various sizes of lamps.

In order to provide a firm, yet smoothly operating connection between the frames A and B ball bearings are provided. These ball bearings are shown in the present instance as comprising two bearing plates 14 superposed upon each other and having corresponding openings 15 through which pass the pivot bolts 9. The meeting faces of the plates 14 are provided with annular raceways 16 in which are seated the balls 17. The plates are provided on their outer faces with pins 18 adapted to engage corresponding openings 19 in the inner overlapping end of one of the sections 2 of the outer frame A and the outer overlapping end of one of the sections 10 of the inner frame B. The inner frame is thus supported in firm bearings and can be easily swung from side to side within the outer frame A.

A foot pedal 20 is provided for swinging the lamp C to the right or to the left for the purpose of illuminating the desired side of the road. This foot pedal is mounted within convenient reach of the driver, being shown in the present instance as provided with rearwardly projecting side flanges 21 which are pivotally mounted at an intermediate point in their length upon a rod 22. Leaf springs 23 engage the toe and heel portions of the foot pedal 20, and the said pedal is thus held yieldingly in a predetermined position, although it can be tilted in either direction by applying pressure to either the toe end or heel end thereof. A connecting rod 24 has one end thereof pivotally connected to the foot pedal 20, while its opposite end is threaded within a sleeve 25, which said sleeve has a ball and socket connection 26 with one side of inner frame B. The springs 23 normally operate to hold the lamp C in such a position that the light rays are projected straight ahead, although by pressing the foot upon the foot pedal 20 and applying pressure at either the heel end or toe end thereof the lamp can be swung to the right or to the left, as desired.

Having thus described the invention, what I claim as new and desire to secure by Letters Patent, is:—

1. A dirigible lamp including an outer frame, means for supporting the same in position, an inner frame arranged within the outer frame and mounted to turn about a vertical axis, a lamp carried by the inner frame, a foot pedal pivotally mounted between the ends thereof, a spring normally holding the foot pedal in predetermined position, and a connecting rod between the foot pedal and lamp, the lamp being normally held in position to project the light rays straight ahead, although it can be swung in either direction by applying pressure to the heel end or toe end of the foot pedal.

2. A dirigible lamp including an outer frame formed with complemental side halves, the respective ends thereof being pivotally connected together, means for supporting the same in position, an inner frame formed with complemental side halves, the respective ends thereof being pivotally connected together, the said inner frame being arranged within the outer frame and mounted to turn about a vertical axis, the said inner frame being adapted to carry a lamp, and means for swinging the inner frame in either direction.

3. A dirigible lamp including an outer frame formed with complemental side halves, means for supporting the same in position, an inner frame arranged within the outer frame and formed with complemental side halves, said inner frame being adapted to carry a lamp, a pair of pivot bolts, each of which passes through the corresponding ends of the side halves of both the outer and inner frames, so as to pivotally connect the side halves of the respective frames, and to pivotally support the inner frame within the outer frame so that the inner frame may swing about a vertical axis, and means for swinging the inner frame in either direction.

4. A dirigible lamp including an outer frame formed with complemental side halves each of which is substantially semi-circular in shape, means for supporting the same in a vertical position, an inner frame arranged within the outer frame and formed with complemental side halves which are substantially semi-circular in shape, the said inner frame being adapted to carry a lamp, bearing plates arranged upon the inner side of the top and bottom of the outer frame, corresponding bearing plates arranged upon the outer side of the top and bottom of the inner frame, a pair of pivot bolts, each of which passes through the corresponding ends of the side halves and bearing plates of both the outer and inner frames, so as to pivotally connect the side halves of the respective frames and to pivotally support the inner frame within the outer frame so that the same may swing about a vertical axis, and means for swinging the inner frame in either direction.

In testimony whereof I have signed my name to this specification in the presence of two subscribing witnesses.

HARRY H. SHORTHILL.

Witnesses:
 E. L. THOMAS,
 E. I. HAINES.

Copies of this patent may be obtained for five cents each, by addressing the "Commissioner of Patents, Washington, D. C."